United States Patent Office 3,649,729
Patented Mar. 14, 1972

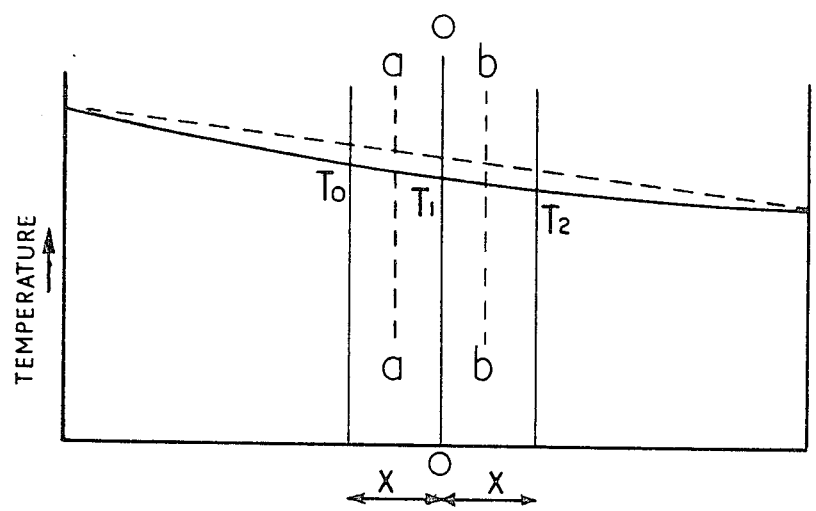

3,649,729
METHOD OF CURING A RUBBER OR PLASTIC TIRE
Edward P. Davis, 77 Elmcroft Road, Yardley, Birmingham, England, and Eric G. Gould, 6 Hawthorn Road, Wylde Green, Sutton Coldfield, England
Continuation-in-part of abandoned application Ser. No. 857,642, Sept. 10, 1969, which is a continuation of application Ser. No. 640,324, May 22, 1967. This application Sept. 11, 1969, Ser. No. 857,175
Claims priority, application Great Britain, Mar. 24, 1966, 12,969/66
Int. Cl. B29h 5/02; G01n 25/00
U.S. Cl. 264—40
13 Claims

ABSTRACT OF THE DISCLOSURE

A method for determining the state of cure of a rubber or plastics article, such as a pneumatic tire, during its cure cycle by sensing the temperature of the article at its surfaces, calculating therefrom the temperature at a point in the article at which an adequate state of cure is desired and thence determining the state of cure at such point. Also the process for curing a rubber or plastics article which includes using the above method to determine the state of cure at a point in the article and terminating the cure when a desired state of cure at that point has been reached, of which the following is a specification.

---

This application is a continuation-in-part of application Ser. No. 857,642, filed Sept. 10, 1969, now abandoned, which in turn is a continuation of application Serial No. 640,324 filed May 22, 1967, now abandoned.

This invention relates to the curing of rubber or plastics articles and is particularly concerned with the determination of the state of cure of rubber articles.

In the manufacture of rubber articles, where the article is made from or includes a vulcanizable rubber compound, it is necessary to cure the compound by heating it to effect vulcanization. An optimum state of cure is obtainable for any given rubber compound, the physical properties of the cured rubber being adversely affected by substantial over or under cure.

Over cure or under cure is sometimes obtained on account of variations, during a cure of a predetermined duration, in the temperature of the steam utilised for heating moulds within which rubber articles are cured. Variation in the temperature of the mould can also take place due to variation in the ambient temperature, variation in the temperature of the heating media and the transfer of heat therefrom to an article to be cured, the degree of use to which the mould is put, i.e. the amount of heat extracted from the mould per unit time and the period during which the mould is left open between curing operations. It is, therefore, desirable to have a method of or an apparatus for, determining the state of cure of the article.

According to the invention there is provided a method of determining the state of cure of a part at least of a rubber or plastics article during the curing thereof comprising sensing at intervals of time the temperature of cure at at least two boundary surfaces of the article, calculating, from each set of said boundary surface temperatures, the corresponding temperature at a point at which an adequate state of cure is desired, said point being located between the boundary surfaces, assessing the relationship of the calculated cure temperature with a predetermined reference temperature of cure and accounting for the elapsed time of cure to determine the state of cure at said point in the article.

In one example of the above method the calculated cure temperature is compared with the predetermined reference temperature of cure to determine the variation between the two temperatures and wherein the temperatures of cure at the boundary surfaces of the article are sensed at uniform intervals of time, said boundary temperatures being sensed at the commencement of each time interval and the corresponding temperature at the point at which said adequate state of cure is desired being forecast for the end of such time interval.

This is forecast using a calculation based on a knowledge of the dimensions of the article, the thermal properties of the article and the time-temperature conditions at surfaces where heat is applied to the article.

The general method of temperature calculation can be described with reference to a simple slab. In the case of a slab its thickness is divided into imaginary strips in a plane perpendicular to the direction of heat-flow across the slab.

FIG. 1 in the accompanying drawing shows such a slab with a temperature profile across it due to the applied temperatures at the outer surfaces of the slab. Eventually the temperature profile will be a straight line (shown dotted) but it is important to be able to determine the temperature path for a given point as it heats up towards its final steady temperature. Thus the situation shown in FIG. 1 is that existing at some general time between the commencement of heating and the attainment of steady state temperature conditions.

In FIG. 1:

$x$ = the strip width, chosen so that the temperature gradient across the strip is sensibly linear
$A$ = cross-sectional area of the slab
$K$ = thermal conductivity of the slab material
$P$ = density of the slab material.

The heat flow across $a$—$a$ during a time interval $dt$ $$= \frac{KA(T_0 - T_1)dt}{x}$$

The heat flow across $b$—$b$ during the time interval $dt$ $$= \frac{KA(T_1 - T_2)dt}{x}$$

The accumulation of heat in the element bounded by $a$—$a$, $b$—$b$ is the difference between these two equations $$= \frac{KA(T_0 - T_1)dt}{x} - \frac{KA(T_1 - T_2)dt}{x}$$

$$= \frac{KA\,dt(T_0 - 2T_1 + T_2)}{x} \quad (1)$$

This accumulation of heat will cause the temperature at $o$—$o$ to rise from $T_1$ to $T'_1$ which requires an amount of heat given by:

$$AxPS(T'_1 - T_1) \quad (2)$$

Where $S$ is the specific heat of the slab material. Equating Equations 1 and 2 we get, after rearrangment $$T'_1 - T_1 = \frac{T_0 - 2T_1 + T_2}{\frac{(x^2 PS)}{(Kdt)}} \quad (3)$$

The expression in brackets is dimensionless and can be represented for convenience by a number, $M$.

Therefore $$T'_1 = \frac{T_0 + (M-2)T_1 + T_2}{M} \quad (4)$$

Using this expression the new temperature of $o$—$o$ can be calculated from the previous temperature situation and the physical properties of the slab. From this equation therefore the temperature profile across the whole slab as the slab is heated can be calculated using knowledge of the initial temperature of the slab and the measured temperatures of its boundary surfaces.

The physical properties K, P and S can be determined experimentally for a range of temperatures. $x$ is chosen so as to give a sensibly linear temperature gradient across each individual strip.

$$M = \frac{x^2 PS}{K dt}$$

Therefore the value of the number M depends upon the time interval $dt$ which is chosen.

Referring to FIG. 1, from the basic physical laws the temperature $T_1$ can never rise above its steady state value. Therefore during the time interval $dt$ the new temperature $T'_1$ must be less than or equal to its steady state value.

$$T'_1 \leq \frac{T_0 + T_2}{2}$$

$$\frac{T_0 + (M-2)T_1 + T_2}{M} \leq \frac{T_0 + T_2}{2}$$

and $M > 2$.

Thus to produce meaningful temperature calculations in practice $dt$ must be chosen so that M is always greater than or equal to 2.

The desired cure at a point under consideration between boundary surfaces of an article is normally predetermined in terms of a specified number of cure units, one cure unit being defined as that cure received at the point under consideration in the article when maintained at a specified reference temperature for one minute.

The process of curing is a chemical reaction the rate of which depends on temperature. The relationship between temperature and rate of reaction can be determined experimentally and it can be shown that the relationship can be expressed by the Arrhenius equation thus:

$$\frac{t_1}{t_2} = \exp\left(-\frac{E}{R}\left(\frac{1}{T_2} - \frac{1}{T_1}\right)\right)$$

where:

R = universal gas constant
E = activation energy. This is determined from the slope of a graph of log (time) against the reciprocal of the absolute temperature. A typical figure is 20 kcal./mole
$t_1$ is the time to desired state of cure at steady temperature $T_1$
$t_2$ is the time to the same state of cure at steady temperature $T_2$.

Thus if the time $t_1$, to reach a desired state of cure at a specified reference temperature $T_1$ is known, the time to reach the same state of cure at other temperatures can be calculated.

In practical cures the actual rubber temperature is not usually steady. However, the cure time at the reference temperature $T_1$ equivalent to the actual cure time $t_3$ during which the temperature has varied can be calculated using a method of numerical integration. This consists of dividing the time-temperature curve for the actual cure into small units of time $dt$, estimating the average temperature during the time interval $dt$ and converting this to the equivalent time of cure at the reference temperature $T_1$. These small increments of cure are then summed to give the equivalent total cure time at the reference temperature $T_1$ i.e. the state of cure.

Cure time at $$T_1 = \sum_0^{t_3} \exp\left(-\frac{E}{R}\left(\frac{1}{T} - \frac{1}{T_1}\right)\right) dt$$

where T is the mean temperature during each time interval.

Instead of the Arrhenius equation it is possible to use empirical equations which fit the observed data e.g.

$$\frac{t_1}{t_2} = \frac{C(T_2 - T_1)}{C(Y)}$$

where C and Y are constants.

For a selected reference temperature of 287° F., the state of cure at any temperature T° F., after an elapsed time of cure of $t$ minutes is expressed as $$\frac{(T - 287)}{(t.CY)}$$

cure units, where C and Y are constants. The above expression has been determined experimentally and in one example for natural or synthetic rubber articles, $C = 2.0$ and $Y = 18$.

A third alternative is a polynominal equation expressing the relationship between the change of properties with temperature and time.

The method according to the invention thus renders it possible to calculate the state of cure at the point under consideration at any time in terms of aggregate number of cure units and to terminate the cure when the desired cure corresponding to a predetermined aggregate number of cure units has been obtained. The time of cure which will provide a specified number of cure units, will vary from one article to another sample of the same article, since as the cure temperature unavoidably varies so must the duration of cure to ensure that each article receives an adequate quota of cure units to ensure that the finished cooled article is not substantially over or under cured.

Conveniently the assessment of the relationship of the calculated temperature of cure with the predetermined reference temperature of cure is not commenced until a predetermined minimum temperature of the point under consideration is attended, such minimum temperature, in one example, being 210° F., for natural or synthetic rubber materials used in pneumatic tire construction.

The method may conveniently be utilised for determining the state of cure of a pneumatic tire during its vulcanization within a mould, the temperature at the point under consideration within the tire being calculated by sensing the temperature at two boundary surfaces of the tire, such surfaces conveniently comprising those adjacent to the point at which minimum cure is expected, e.g. the tread surface of the tire and the radially-inner surface of the tire both considered at the shoulder region thereof. Alternatively, this latter surface may comprise the surface adjacent to the shoulder region of a tire, of a curing diaphragm or bag located within the mould.

The vulcanizable material from which the tire is made may be one of a large range of rubber and plastics materials. For example, sulphur vulcanizing materials may be used such as natural rubber and synthetic rubbers containing olefinic unsaturation, for example styrene-butadiene rubber, butadiene-acrylonitrile rubber, polyisoprene, polybutadiene, and unsaturated copolymers of ethylene, propylene and a polyene. Alternatively peroxide vulcanizing materials may be used such as the unsaturated rubbers as mentioned above or various saturated polymers such as ethylene-propylene rubber, polyethylene, polyurethane, silicone rubber, copolymers of ethylene with vinyl alkanoic esters, e.g. ethylene-vinyl acetate copolymer, or with alkyl acrylates, alkyl methacrylates or unsaturated mono- or dicarboxylic acids. Further, materials which are curable by other systems may be used, e.g. poly(vinyl chloride) which may be cured with polyamines or polyamides.

The essential feature of the rubber and plastics materials to which this invention can be applied is that it must be possible to determine the relationship between temperature and the rate of the cross-linking reaction.

Sulphur vulcanization may be carried out in the usual manner using accelerators and the various other compounding ingredients generally used.

Similarly peroxide vulcanization may be carried out in the usual manner, the rubber or plastic being thoroughly compounded with peroxide before curing. Examples of peroxides which can be used are dicumyl peroxide, 2,2 bis (4,4 di,t. butyl peroxy cyclohexyl propane), 1,4 bis (t. butyl peroxy isopropyl benzene) and di.t. butyl peroxide, although many other organic peroxides are commercially available and can be used.

The apparatus for determining the state of cure of a part at least of a rubber or plastics article comprises at least two temperature sensors locatable one at each of at least two boundary surfaces of the article to be cured, calculating means for determining the temperature of the article at a point between the boundary surfaces at which an adequate state of cure is desired, means for assessing the relationship of the calculated temperature with a predetermined reference temperature of cure and means for accounting for the elapsed time of cure to determine the state of cure at said point in the article.

Preferably the calculating means, the means for assessing the relationship of the calculated temperature with the reference temperature and the means for accounting for the elapsed time of cure comprises a computer device.

An alarm system may be provided which is operable if any or all of the factors contributing to a satisfactory cure of the tire deviate substantially from a predetermined range of values.

Also in accordance with the invention there is provided a cured rubber or plastics article e.g. a pneumatic tire, wherein the state of cure during the curing of such an article has been determined by the method or apparatus described above.

Embodiments of the invention will now be described in more detail by way of example.

In this embodiment steam-heated moulds are utilised in the moulding and curing process during the manufacture of rubber pneumatic tires and the state of cure of each tire is determined by a computer device which is suitably programmed for the number of cure units required for adequate cure of a point under consideration located within the tire, to enable the tire to be removed from the mould. This point is selected to give a satisfactory cure at said point whilst still producing an adequate state of cure for the whole tire when cooled.

The point in the tire at which this cure condition is required may be located at the interface of the carcass with the tread layers or tread and breaker layers in the shoulder region of the tire, i.e. at a point at which minimum cure might normally be expected. Such a point lies between two boundary surfaces of the tire which comprise the radially-inner surface of the inner liner of the tire and the radially-outer surface of the tread, this latter surface conveniently comprising the surface of the tread shoulder portion. In order to ascertain the temperature at this critical point during the moulding and curing operation, the temperature is sensed by sensing elements located at the aforesaid boundary surfaces of the tire and a set of readings of the temperatures at said surfaces is obtained during the curing process at the commencement of each of a series of predetermined uniformly spaced-apart times, such times being dependent upon the thickness of rubber between the two boundary surfaces and also upon the co-efficient of thermal conductivity, density and specific heat of the rubber.

In order that the temperature of the critical point under consideration may also be determined, each set of boundary surface temperature readings obtained at the commencement of each predetermined time interval is fed to a computer device which forecasts the temperature of the point under consideration at the end of such timer interval and which takes into account the ambient or preheated temperature of the tire, whichever is appropriate. Thus a calculated temperature of said point is obtained corresponding to each set of sensed boundary surface temperatures. This calculated temperature is compared, by means of the computer, with a predetermined reference temperature of cure and the elapsed time of cure is also accounted for to determine the state of cure at said point in the article. The state of cure at said point is determined in terms of an aggregate number of cure units and such calculation of the state of cure is not commenced until a predetermined minimum temperature of cure of the point under consideration is reached, said temperature being 210° F. When the calculated aggregate number of cure units is obtained corresponding to the adequate state of cure for the point under consideration the cure process is terminated.

Different cure cycles are utilized for different types of tire constructions e.g. whether they have rayon, nylon or steel cords in the breaker or carcass.

For example, when a tire having a carcass formed of rubberised rayon cords is being cured the opening of the curing press is initiated when the comparison of the calculated temperature with the reference temperature of cure and the elapsed time of cure indicates that the state of cure is such that no porosity will develop in the tire upon release of pressure within the press. This adequate state of cure is of course predetermined in terms of a specified number of cure units provided in a programme supplied to the computer device before the cure cycle is initiated.

However, when a carcass formed of rubberised nylon cords is cured it is necessary to cool the tire before the pressure is released within the press to prevent distortion or growth of the tire while the nylon is in a hot plastic state. In this case, the calculated temperature of the point under consideration (normally not in the carcass) is again compared with the reference temperature of cure and the elapsed time of cure accounted for until the computer device indicates that a satisfactory state of cure at said point is obtained. Upon completion of this cure, a cold flood is initiated within the press to cool the tire and the temperature of a desired point (within the carcass) is calculated from the boundary temperatures. When this calculated carcass temperature has fallen to the required value the opening of the press is initiated. Again a satisfactory state of ccure in terms of a specified number of cure units is provided for in a programme supplied to the computer device, and, in addition, the required cooled temperature of the carcass is provided in a programme supplied to the computer.

However, when a post-cure inflation process is utilised in the curing of a rubberised nylon cord carcass no cold flood is necessary within the curing press since the hot tire is removed from the press and rapidly mounted upon a former, inflated and left to cool to substantially ambient temperature. In such a process the determination of an adequate state of cure to permit safe opening of the press is carried out in the same manner as that hereinbefore described for a rubberised rayon cord carcass.

When a carcass formed of rubberised steel cords is cured it is normal to give the tire an extended cold flood within the press to control accurately the total amount of cure in order to ensure an adequate rubber to steel bond. In this case the temperature is calculated within the tire at a point dictated by bonding considerations, the elapsed time of cure is accounted for and, as in the case of a nylon construction, the temperature is then calculated, from the boundary temperatures, at the same point in the tire until the temperature has fallen to the required value at which time the opening of the press is initiated.

It will be appreciated that the temperature may be calculated at any point within the tire between two, or more than two, boundary surfaces by means of a suitable computer device and although it is found convenient that the radially-inner boundary surface should comprise the inner liner of the tire in the shoulder region thereof said surface may alternatively comprise either the inner or outer surface of a curing bag or diaphragm adjacent the shoulder region of the tire, by means of which the tire is moulded.

Although the shoulder region of the tire has been referred to, the point under consideration may be, for example, at the crown of the tread or in a bead region. Also the invention is not limited to the determination of the state of cure during the vulcanization of pneumatic tires but may be equally applicable to other rubber or plastics articles and the invention also includes the control of the finally cured state of pneumatic tires or other rubber or plastics articles.

To show how the temperature calculations are carried out in practice the following worked example is given for a slab of solid rubber:

Thickness of slab = 24 mm.
Strip width $x = 4$ mm.
Total number of strips = 6

The ratio of physical properties $K/PS$ varies with temperature and is determined experimentally for the temperature range concerned. In this case $K/PS$ decreases with temperature; so that M increases with temperature. The value of M at ambient temperature was calculated to be 7.8 (i.e. M>2) the time interval $dt$ being 0.2 min.

The boundary temperatures of the slab were measured at 0.2 minute intervals, and these values are given in °F. in columns 1 and 7 below. The initial temperature of the slab (ambient temperature) was 82° F.

The values in columns 2 to 6 below are the calculated temperatures (°F.) of the boundaries between the imaginary strips. These values are calculated using the Equation 4

$$T'_1 = \frac{T_0 + (M-2) T_1 + T_2}{N}$$

Thus, for example, the value at time 0.2 min. in column 2 is calculated from the values in columns 1, 2 and 3 at time 0 min. where $T_0 = 204$, $T_1 = 82$ and $T_2 = 82$, $M = 7.8$.

| Time, minutes | 1 | 2 | 3 | 4 | 5 | 6 | 7 |
|---|---|---|---|---|---|---|---|
| 0 | 204 | 82 | 82 | 82 | 82 | 82 | 82 |
| 0.2 | 210 | 98 | 82 | 82 | 82 | 82 | 82 |
| 0.4 | 230 | 110 | 84 | 82 | 82 | 82 | 86 |
| 0.6 | 236 | 121 | 87 | 82 | 82 | 83 | 85 |
| 0.8 | 239 | 131 | 91 | 83 | 82 | 83 | 100 |
| 1.0 | 242 | 139 | 95 | 84 | 82 | 85 | 109 |

Subsequent temperatures are similarly calculated to achieve the final temperature distribution across the block, which in this example, after 11.8 was as follows: 11.8, 273, 238, 213, 202, 206, 226, 258.

As would be expected the temperature in the slab is lowest close to its mid-point as shown by the values in columns 4 and 5.

For a composite article such as a tire the same procedure is followed in the calculations but each stratum of the article is treated separately. For example, in a tire the tread and casing have different physical properties so that M is not the same for the tread and the casing. In this case the tread and casing are each divided into a whole number of imaginary strips (it is not necessary for the thickness of tread strips to be the same as the thickness of the casing strips) and the temperatures are calculated as before using the same time intervals for both.

To illustrate how the state of cure at a given point is calculated from knowledge of the temperature at the point the following worked example is given:

In this worked example the rubber is vulcanized using sulphur and

E = 19.5 Kcal./mole
R = 1.987 cal./° C./mole
Reference temperature 287° F.
Reference time 1 minute

| Time, minutes | Temp., °F. | Average temp. | Cure increment, mins. at 287° F. | Total cure input, mins. at 287° F. |
|---|---|---|---|---|
| 0 | 99 | | | |
| 1 | 108 | | | |
| 2 | 158 | | | |
| 3 | 200 | | | |
| 4 | 230 | 215.0 | 0.08 | 0.08 |
| 5 | 256 | 243.0 | 0.23 | 0.31 |
| 6 | 276 | 266.0 | 0.50 | 0.81 |
| 7 | 292 | 284.0 | 0.91 | 1.72 |
| 8 | 303 | 297.5 | 1.39 | 3.11 |
| 9 | 312 | 307.5 | 1.88 | 4.99 |
| 10 | 320 | 316.0 | 2.42 | 7.41 |

NOTE.—Average temperatures below 215° F. have not been used for calculating cure state because the cure increment at these temperatures is extremely small.

Having now described our invention what we claim is:

1. A method of curing a rubber or plastics tire by controlling the amount of cure at a point within said tire remote from direct measurement thereof comprising:
   (a) initially heating said tire;
   (b) thereafter at intervals of time measuring the temperature of at least two boundary surfaces at points which, together with the point within said tire, lie on a straight line parallel to the direction of heat flow through the tire;
   (c) determining the temperature at said point within the tire from said boundary temperatures as a function of the thermal conductivity, density and specific heat of said tire along said straight line at the then existing temperature of said tire and continuing the heating of said tire as a function of the temperature at said point;
   (d) determining the state of cure in cure units at said point within said tire from said temperature at said point,
   (e) terminating the heating of said tire when the state of cure in cure units at said point within said tire reaches a predetermined level which is the number of cure units necessary to achieve the desired cure, one cure unit being the amount of cure inserted per unit time at a point in the tire when the temperature at that point is a selected reference temperature.

2. A method according to claim 1 in which the number of cure units at said point within said tire is defined by the expression $$t \cdot C \frac{(T_2 - T_1)}{Y}$$

where $t$ is the elapsed time of cure, $T_1$ is the selected reference temperature and C and Y are constants.

3. A method according to claim 2 in which the article is a natural or synthetic rubber tire being vulcanized using sulphur and $T_1 = 287°$ F., $C = 2.0$ and $Y = 18$.

4. A method according to claim 1 in which the number of cure units at said point within said tire is defined by the Arrhenius equation.

5. A method according to claim 1 in which the number of cure units at said point within said tire is defined by a polynomial equation.

6. A method according to claim 1 wherein determination of the state of cure in cure units is commenced after the temperature at said point reaches a predetermined temperature.

7. A method according to claim 6 wherein the minimum predetermined temperature is 210° F.

8. A method according to claim 1 in which the tire is a pneumatic tire and the curing is carried out in a mould.

9. A method according to claim 8 wherein the boundary surfaces comprise a tread surface of the tire at the shoulder region thereof and a surface adjacent said shoulder region of a cure bag or diaphragm located within the mould.

10. A method according to claim 1 in which the tire is cured in a mould further comprising:
    (e) cooling said tire within said mould (f) thereafter measuring the temperature of at least two said boundary surfaces of said tire at intervals of time
(g) continuing the cooling of said tire as a function of the temperature at a point located between the boundary surfaces of the tire, the temperature at said point being determined from the temperatures of the boundary surfaces
(h) terminating the cooling of said tire when the temperature at said point reaches a predetermined level
(i) opening said mould and removing said tire.

11. A method of curing a rubber or plastics tire by controlling the amount of cure at a point within said tire remote from direct measurement thereof comprising:
(a) initially heating said tire;
(b) thereafter at intervals of time measuring the temperature of at least two boundary surfaces at points which, together with the point within said tire, lie on a straight line parallel to the direction of heat flow through the tire;
(c) determining the temperature at said point within the tire from said boundary temperatures according to the following equation:

$$T_1' = \frac{T_0 + (M-2)T_1 + T_2}{M}$$

wherein $$M = \frac{x^2 PS}{K dt}$$

in which $x$ is a strip width along said straight line chosen so that the temperature gradient thereacross is approximately linear, K is the thermal conductivity, P is the density and S is the specific heat of said tire along said straight line at the then existing temperature of said tire, $T_1'$ is the temperature at said point, $T_1$ is the temperature at said point at the beginning of $dt$ which is the time interval between measurements, and $T_0$ and $T_2$ are the boundary temperatures;
(d) continuing the heating of said tire as a function of the temperature at said point; and
(e) terminating the heating of said tire when the state of cure in cure units at said point within said tire reaches a predetermined level which is the number of cure units necessary to achieve the desired cure, one cure unit being the amount of cure inserted per unit time at said point in said tire when the temperature at said point is a selected reference temperature, said state of cure in cure units being determined using the expression $$t \cdot C \frac{(T_2 - T_1)}{Y}$$

wherein $t$ is the elapsed time of cure, $T_2$ is said temperature at said point, $T_1$ is the selected reference temperature and C and Y are constants.

12. A method of curing a rubber or plastics tire by controlling the amount of cure at a point within said tire remote from direct measurement thereof comprising:
(a) initially heating said tire;
(b) thereafter at intervals of time measuring the temperature of at least two boundary surfaces at points which, together with the point within said tire, lie on a straight line parallel to the direction of heat flow through the tire;
(c) determining the temperature at said point within the tire from said boundary temperatures according to the following equation:

$$T_1' = \frac{T_0 + (M-2)T_1 + T_2}{M}$$

wherein $$M = \frac{x^2 PS}{K dt}$$

in which $x$ is a strip width along said straight line chosen so that the temperature gradient thereacross is approximately linear, K is the thermal conductivity, P is the density and S is the specific heat of said tire along said straight line at the then existing temperature of said tire, $T_1'$ is the temperature at said point, $T_1$ is the temperature at said point at the beginning of $dt$ which is the time interval between measurements, and $T_0$ and $T_2$ are the boundary temperatures;
(d) continuing the heating of said tire as a function of the temperature at said point; and
(e) terminating the heating of said tire when the state of cure in cure units at said point within said tire reaches a predetermined level which is the number of cure units necessary to achieve the desired cure, one cure unit being the amount of cure inserted per unit time at said point in said tire when the temperature at said point is a selected reference temperature, said state of cure in cure units being determined using the Arrhenius equation.

13. A method of curing a rubber or plastics tire by controlling the amount of cure at a point within said tire remote from direct measurement thereof comprising:
(a) initially heating said tire;
(b) thereafter at intervals of time measuring the temperature of at least two boundary surfaces at points which, together with the point within said tire, lie on a straight line parallel to the direction of heat flow through the tire;
(c) determining the temperature at said point within the tire from said boundary temperatures according to the following equation:

$$T_1' = \frac{T_0 + (M-2)T_1 + T_2}{M}$$

wherein $$M = \frac{x^2 PS}{K dt}$$

in which $x$ is a strip width along said straight line chosen so that the temperature gradient thereacross is approximately linear, K is the thermal conductivity, P is the density and S is the specific heat of said tire along said straight line at the then existing temperature of said tire, $T_1'$ is the temperature at said point, $T_1$ is the temperature at said point at the beginning of $dt$ which is the time interval between measurements, and $T_0$ and $T_2$ are the boundary temperatures;
(d) continuing the heating of said tire as a function of the temperature at said point; and
(e) terminating the heating of said tire when the state of cure in cure units at said point within said tire reaches a predetermined level which is the number of cure units necessary to achieve the desired cure, one cure unit being the amount of cure inserted per unit time at said point in said tire when the temperature at said point is a selected reference temperature, said state of cure in cure units being determined using a polynomial equation.

References Cited

UNITED STATES PATENTS 3,489,833    1/1970    Lehnen _____ 264—315

OTHER REFERENCES

Paschkis, Victor, "A Study of Curing Tires," Rubber Age, vol. 69, No. 1, April 1951, pp. 45–50.

ROBERT F. WHITE, Primary Examiner

J. H. SILBAUGH, Assistant Examiner

U.S. Cl. X.R.

73—15 R; 264—315, 326

UNITED STATES PATENT OFFICE
CERTIFICATE OF CORRECTION

Patent No. 3,649,729  Dated March 14, 1972

Inventor(s) EDWARD PAUL DAVIS ET AL

It is certified that error appears in the above-identified patent and that said Letters Patent are hereby corrected as shown below:

Column 4, lines 3 to 5, the formula "$\frac{t_1}{t_2} = \frac{C(T_2-T_1)}{CY}$"

should read "$\frac{1}{t_2} \quad C^{\frac{(T_2-T_1)}{Y}}$" i.e. $\frac{t_1}{t_2}$ is equal to C to the power of $(T_2-T_1)/Y$;

lines 10 to 12 the formula "$\frac{(T-287)}{(T-287)}$" should be expressed as "$(t.C \quad \frac{(T-287)}{Y} \quad$ i.e. t multiplied by C to the power of $(T-287)/Y$.

Column 5, line 70, "timer" should read "time".

Column 6, line 41, "ccure" should read "cure".

Columns 8 and 9, lines 45 to 48 and 51 to 53 respectively, the formula should read $t.C^{\frac{T_2-T_1}{Y}}$ Signed and sealed this 2nd day of January 1973.

(SEAL)
Attest:

EDWARD M. FLETCHER, JR.
Attesting Officer

ROBERT GOTTSCHALK
Commissioner of Patents